Dec. 30, 1941.                B. C. PLACE                2,267,873
                                FASTENER
                            Filed May 1, 1939
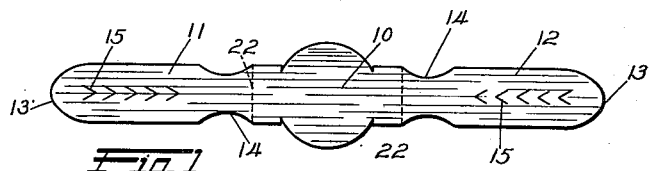
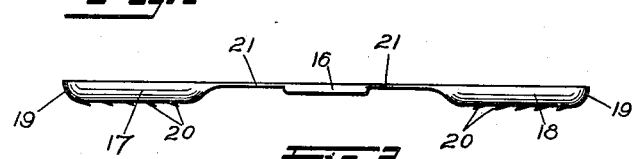
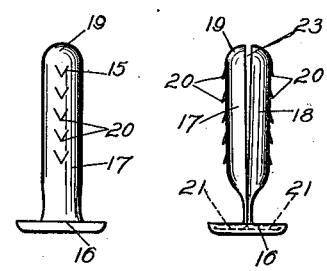
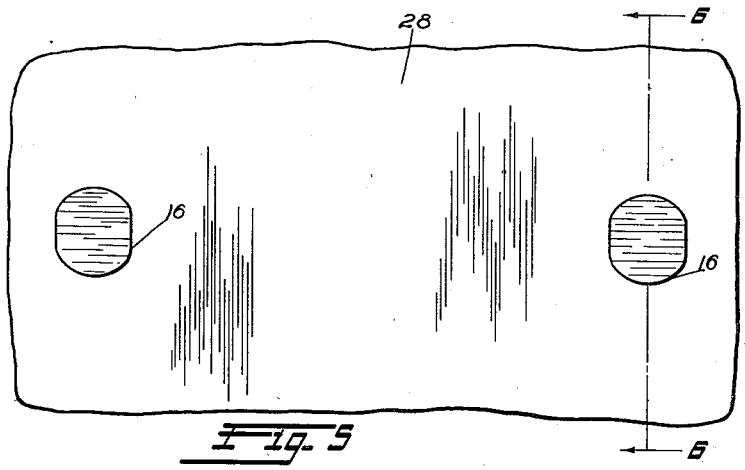
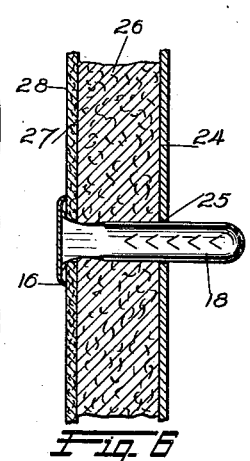
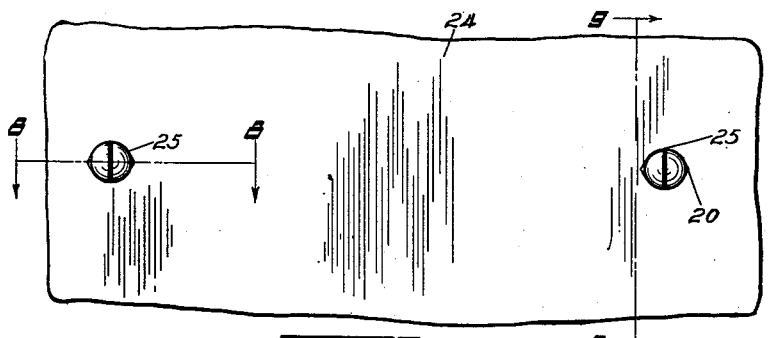
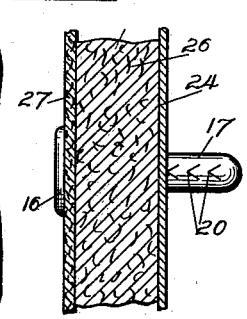
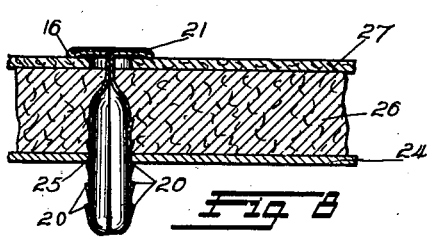
Inventor
Bion C. Place
By Strauch & Hoffman
Attorneys Patented Dec. 30, 1941

2,267,873

UNITED STATES PATENT OFFICE 2,267,873

FASTENER

Bion C. Place, Detroit, Mich., assignor of one-half to George E. Gagnier, Detroit, Mich.

Application May 1, 1939, Serial No. 271,213

3 Claims. (Cl. 24—208)

The present invention relates to sheet metal spring stud fasteners. More particularly, the invention is concerned with a spring stud fastener capable of successful use in securing compressible materials, by providing a plurality of spaced pairs of holding shoulders permitting the degree of compression of the material to be varied by selection of the proper pair of shoulders.

In securing relatively thick and compressible materials to a metallic supporting structure by means of spring stud fasteners it is very desirable to utilize a fastener having a multiplicity of holding shoulders arranged at spaced intervals along the length of the stud part of the fastener so that the same fastener can be used with varying thicknesses of material, and so that the degree of compression to which the compressible materials may be subjected, may be varied by simply exerting pressure against the material and the fastener that holds it in position to bring the proper pair of the series of holding shoulders into operative position. Compressible materials which may be most conveniently secured by spring stud fasteners are used, for example, in portions of automobile bodies, such as in dash silencer insulating pads.

Furthermore, when the head of the fastener is exposed as in the securing of the dash silencer pads or insulating panels, and as is frequently the case in other situations fasteners are preferred whose heads present a neat, rounded and finished appearance. And when the fasteners are relied upon to sustain the weight of the material, fasteners are frequently preferred which engage the wall of the perforation in the supporting structure throughout substantially its entire circumference, because thereby the weight of the supported structure is distributed over a greater area of the supporting structure. Furthermore, spring stud fasteners that substantially completely fill the socket provided by a perforation in the supporting structure have the advantage in that relative motion between the fastener and the supporting structure cannot take place, and when the stud part is exposed to view the appearance is frequently thought to be better.

The primary purpose of the present invention is to provide a spring stud fastener having all of the desirable attributes of a spring fastener just stated and intended particularly to secure materials of varying thickness and of compressibility to a metallic supporting structure, which provides the socket for the reception of the stud part of the fastener in the form of a simple perforation therein.

This invention also aims to provide a spring stud fastener constructed entirely from a single piece of sheet metal and properly bent to provide a neat appearing head, and a stud part of generally tubular or cylindrical form carrying a multiplicity of shoulders spaced longitudinally of the stud part whereby the degree of usefulness of the fastener is greatly increased.

A still further object of the invention is to provide a sheet metal spring stud fastener having improved holding shoulders formed by the simple expedient of striking tooth-like projections from semi-cylindrical walls forming a portion of the stud part of the fastener.

Still further objects of the invention will appear as the description thereof proceeds with reference to the accompanying drawing, in which:

Figure 1 is a plan view of a sheet metal blank from which the preferred form of fastener of the present invention may be readily constructed;

Figure 2 is an edge view of the blank after it has been subjected to a preliminary die shaping operation;

Figures 3 and 4 are respectively side and edge views of the preferred form of fastener constructed from the blank of Figure 1;

Figure 5 is a fragmentary front view of a dash silencer pad and panel secured in position by fasteners of the present invention;

Figure 6 is a sectional view taken on the plane indicated by the line 6—6 of Figure 5 looking in the direction of the arrows;

Figure 7 is a fragmentary rear view of the structure illustrated in Figure 5;

Figures 8 and 9 are sectional views taken, respectively, on the planes indicated by the lines 8—8 and 9—9 in Figure 7, looking in the direction of the arrows.

Like reference characters indicate like parts throughout the various figures.

The blank from which the one piece sheet metal fastener of the present invention is constructed comprises a preferably circular central portion 10 from which extend elongated portions 11 and 12. The latter portions have rounded ends 13. Notches 14 are preferably formed in each side of each of the portions 11 and 12 for a purpose presently to be referred to.

A series of V-shaped incisions 15, five being shown, are likewise formed in each of the portions 11 and 12, said incisions being equally spaced and the incisions in the portions 11 being spaced from the rounded end 13 of said portion distances equal to the spacing of the incisions 15 in the portion 12 from the rounded end thereof.

In order to produce the fastener, the blank 5 of Figure 1 is subjected to a die shaping operation which serves to dish the central portion 10 of the blank providing a generally circular head portion having a rim 16. The portions 11 and 12 are pressed throughout the major portion of their length to provide semi-cylindrical portions 17 and 18. The ends of the portions 17 and 18 are preferably shaped to provide approximately quadri-spherical ends 19. Preferably the portion of the blank between the dished portion 16 and the semi-cylindrical portions 17 and 18 are maintained flat.

Preferably in the operation of shaping the portions 17 and 18 the teeth separated by the V-shaped incisions 15 are pressed out of the plane of the blank providing a multiplicity of holding shoulders 20 on each of said portions, though said shoulders may be provided in a separate operation, if desired.

The formation of the fastener is completed by bending the flat portion 21 adjacent the dished central portion 16 underneath said portions so that they are housed within the dished portion as indicated in Figure 4. The dished portion 16 and the portions 21 together form the head part of the completed fastener. The stud part, which is formed by bending the elongated portions of the blank toward each other on the dotted lines indicated by 22 in Figure 1, until the semi-cylindrical portions 17 and 18 are disposed in side-by-side, but spaced, relation together forming a hollow tubular stud part. Preferably, the elongated portions of the blank are bent into contact with each other adjacent the head 16 and are substantially spaced apart at the end of the stud part as indicated by 23. Inasmuch as the fastener is made of properly tempered sheet material the stud part of the fastener is expansible and contractible, the space 23 being closed more or less as the stud part is forced in the perforation or socket to which reference will be presently made. The notches 14 provide a stud part having no materially greater width adjacent the head part than remote therefrom since the width of the portions 11 and 12 is reduced in shaping these portions into semi-cylindrical form.

A preferred use of the fastener just described is illustrated in Figures 5 to 9, inclusive, in which 24 designates a portion of the metallic wall of the dash of an automobile body, for example. Said wall is provided with a plurality of perforations 25 for the reception of fasteners that secure the silencer pad 26 and the panel 27 against said dash. The silencer pad 26 may be constructed in any desired manner, and may constitute jute fibres or the like, which may be held together in pad-like form by paper or in any other way. The dash panel 27 may constitute a stiff sheet of fibre board having a suitably finished exterior surface 28.

The panel 27 and the pad 26 are provided with openings registering with the openings 25 in the dash and the superposed parts are then secured together by inserting the fasteners through said aligned openings and in the perforation 25. The openings in the panel 27 and in the pad 26 are made to conform substantially in size to the diameter of the stud part of the fastener so that when the fastener is in position in the panel and pad, shifting of either of the pad or the panel with respect to the fastener cannot take place, and the opening 25 is preferably made of the same diameter as the tubular portion of the stud part of the fastener after the semi-cylindrical sections are moved substantially towards each other. In forcing the stud part of the fastener through the perforation 25 the spherical end thereof first engages the wall of the opening causing a contraction of said part. By causing the semi-cylindrical portions to move toward each other the fastener is inserted until the proper pair of shoulders, provided by the teeth 20, engages the side of the dash 24 beyond that which is engaged by the pad 26, the pair of shoulders being selected that will maintain the pad under proper compression.

It will be understood that in the final position of the fastener, the semi-cylindrical portions engage the wall of the perforation 25 throughout substantially its entire circumference and that the shoulders engage the side of the dash adjacent the perforation only on two diametrically opposite lines radiating from said perforation. A firm engagement between the stud part of the fastener and the dash is thus insured regardless of departures from a true plane surface on said side of the dash.

It will be understood further that in view of the fact that a series of shoulders are provided on each side of the stud part of the fastener, the same fastener may be used in securing pads of varying thicknesses and panels of varying thicknesses within quite wide ranges, the stud part of the fastener protruding more or less beyond the dash in accordance with the thickness of the materials secured by the fastener. Such protrusion is not objectionable inasmuch as the protruding part of the fastener is nicely rounded and substantially completely fills the hole from which it projects. Furthermore, inasmuch as the teeth formed by forming the shoulders 20 protrude only a slight distance from the substantially tubular stud part of the fastener, no objectionable sharp points are presented that might cause laceration of the hands of persons having occasion to work in the vicinity of said protruding end. If desired, the fastener may readily be removed and the pad and panel replaced by simply forcing the semi-cylindrical portions towards each other as by a pair of pliers or the like applied to the exposed end of the stud part.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A spring stud fastener, comprising a head part and a stud part consisting of the two ends of an elongated sheet metal blank, portions of said ends being flat and contacting adjacent the head part, other portions of each of said ends being pressed into semi-cylindrical form, said portions being increasingly separated from each other to provide a split cylinder having a sector-like opening beyond said contacting flat portions capable of expansion and contraction, and means formed from said semi-cylindrical portions and providing transversely alined holding shoulders.

2. A spring stud fastener, comprising a head part consisting of the midportion of an elongated sheet metal blank and a stud part consisting of the ends of said blank, said ends each including portions pressed into semi-cylindrical form and also including flat portions arranged in contact adjacent said head part, said first-named portions being disposed in divergent spaced relation from the point of contact of said flat portions to the end of the stud part, said first-named portions forming a split cylindrical stud part, and a series of alined teeth pressed from each of said semi-cylindrical portions.

3. A spring stud fastener, comprising a head part consisting of the midportion of an elongated sheet metal blank, and a stud part consisting of the ends of said blank, said ends each including portions pressed into semi-cylindrical form and also including flat portions arranged in contact adjacent said head part, said first-named portions being disposed in divergent spaced relation from the point of contact of said flat portions to the end of the stud part, said ends forming a split cylindrical stud part, and a series of V-shaped incisions in diametrically opposite points spaced longitudinally of said semi-cylindrical portions, said incisions providing tongues, said tongues being pressed from said part so as to provide alined holding shoulders.

BION C. PLACE.